(12) United States Patent
Bienas et al.

(10) Patent No.: US 11,399,297 B2
(45) Date of Patent: *Jul. 26, 2022

(54) RESOURCE CONTROLLER FOR RESOURCE MANAGEMENT IN A TELECOMMUNICATION NETWORK

(71) Applicant: IPCom GmbH & Co. KG, Pullach (DE)

(72) Inventors: Maik Bienas, Schoeppenstedt (DE); Andreas Schmidt, Braunschweig (DE); Martin Hans, Bad Salzdetfurth (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,532

(22) Filed: Oct. 25, 2019

(65) Prior Publication Data

US 2020/0059804 A1  Feb. 20, 2020

Related U.S. Application Data

(63) Continuation of application No. 15/518,610, filed as application No. PCT/EP2015/074157 on Oct. 19, 2015, now Pat. No. 10,477,421.

(30) Foreign Application Priority Data

Oct. 20, 2014  (EP) .................................... 14189528

(51) Int. Cl.
*H04W 24/08* (2009.01)
*H04W 76/14* (2018.01)
(Continued)

(52) U.S. Cl.
CPC ........... *H04W 24/08* (2013.01); *H04W 24/10* (2013.01); *H04W 72/0486* (2013.01);
(Continued)

(58) Field of Classification Search
CPC ..... H04W 76/14; H04W 24/08; H04W 24/10; H04W 72/0486; H04W 72/085
See application file for complete search history.

(56) References Cited

U.S. PATENT DOCUMENTS 9,655,165 B2 * 5/2017 Cho ...................... H04W 76/30
9,763,278 B2    9/2017 Seo
(Continued)

FOREIGN PATENT DOCUMENTS

| CN | 103229582 A | 7/2013 |
| KR | 20130063644 A | 6/2013 |
| WO | WO-2014148969 A1 | 9/2014 |

OTHER PUBLICATIONS

International Search Report for International Application No. PCT/EP2015/074157, dated Dec. 22, 2015.
(Continued)

*Primary Examiner* — Redentor Pasia
(74) *Attorney, Agent, or Firm* — Marshall, Gerstein & Borun LLP

(57) ABSTRACT

The present invention provides a resource controller for resource management in a telecommunication network, the telecommunication network providing a first set of resources for cellular communication and a second set of resources for direct device-to-device, D2D, communication between UEs, the resource controller comprising a measurement request unit being arranged to request a measurement be performed by at least one user equipment, the measurement indicating a capacity utilization of the second set of resources; and a resource pool adaption unit being arranged to adapt the first set of resources and the second set of resources as a function of the performed measurement. In particular, where no resources are available for D2D communication, a UE may (Continued)

request a bearer setup and in response suitable resources for D2D communication are provided.

13 Claims, 8 Drawing Sheets

(51) Int. Cl.
  *H04W 72/04* (2009.01)
  *H04W 24/10* (2009.01)
  *H04W 72/08* (2009.01)
  *H04W 92/18* (2009.01)
  *H04W 76/36* (2018.01)

(52) U.S. Cl.
  CPC ......... *H04W 72/085* (2013.01); *H04W 76/14* (2018.02); *H04W 76/36* (2018.02); *H04W 92/18* (2013.01)

(56) References Cited

U.S. PATENT DOCUMENTS

| | | | |
|---|---|---|---|
| 10,477,421 B2* | 11/2019 | Bienas | H04W 24/10 |
| 2011/0106952 A1 | 5/2011 | Doppler et al. | |
| 2013/0059583 A1 | 3/2013 | Van Phan et al. | |
| 2013/0242866 A1* | 9/2013 | Lin | H04B 7/26 370/328 |
| 2013/0244661 A1* | 9/2013 | Lin | H04W 76/14 455/436 |
| 2014/0038590 A1* | 2/2014 | Wijting | H04W 76/14 455/426.1 |
| 2014/0094183 A1* | 4/2014 | Gao | H04W 72/04 455/450 |
| 2014/0099958 A1* | 4/2014 | Wilhelmsson | H04W 36/30 455/437 |
| 2014/0204847 A1* | 7/2014 | Belleschi | H04W 76/14 370/329 |
| 2015/0215767 A1* | 7/2015 | Siomina | H04W 76/14 455/435.2 |
| 2016/0007338 A1* | 1/2016 | Van Phan | H04W 72/12 455/435.1 |
| 2016/0277922 A1* | 9/2016 | Gunnarsson | H04W 36/24 |
| 2016/0338035 A1* | 11/2016 | Matsumoto | H04W 72/0446 |
| 2016/0360449 A1* | 12/2016 | Lu | H04W 76/23 |
| 2016/0374128 A1* | 12/2016 | Fukuta | H04W 76/14 |
| 2017/0041971 A1* | 2/2017 | Kim | H04W 76/14 |
| 2017/0086176 A1* | 3/2017 | Seo | H04W 56/002 |
| 2017/0099689 A1* | 4/2017 | Kalhan | H04W 72/04 |
| 2017/0188404 A1* | 6/2017 | Fodor | H04W 76/14 |
| 2017/0196030 A1* | 7/2017 | Ma | H04W 92/18 |
| 2017/0238169 A1* | 8/2017 | Siomina | H04W 8/24 370/329 |
| 2017/0265155 A1* | 9/2017 | Kim | H04L 27/2692 |
| 2018/0338256 A1* | 11/2018 | Fodor | H04W 76/14 |

OTHER PUBLICATIONS

Written Opinion of the International Searching Authority, for International Application No. PCT/EP2015/074157, dated Dec. 22, 2015.

Examination Report issued to Application No. 201717008686 by the Government of India, Intellectual Property India, dated Jun. 23, 2020.

Notice of Preliminary Rejection for KR Application No. 10-2020-7007609 dated Jun. 14, 2021.

* cited by examiner

RESOURCE CONTROLLER FOR RESOURCE MANAGEMENT IN A TELECOMMUNICATION NETWORK

CROSS-REFERENCE TO RELATED APPLICATIONS

This application is a continuation of U.S. patent application Ser. No. 15/518,610, filed Apr. 12, 2017, which is a national phase application of PCT/EP2015/074157, filed Oct. 19, 2015, which claims the benefit of European Priority Patent Application EP14189528.4, filed Oct. 20, 2014. These disclosures are hereby incorporated by reference in their entireties.

BACKGROUND

Two kinds of resource pools can be provided in LTE. A first pool for the cellular communication between the involved user equipment, also referred to as mobile phones, and the cellular network and a second pool for direct communication. An LTE resource pool may be considered as an allocation of available resource blocks and/or resource elements for transmission. Generally speaking, an LTE resource pool may be considered as a combination of a distinct part of the channel bandwidth (number of sub-carriers) and a certain amount of time (duration of n symbols) within the LTE resource lattice. Said allocation may include restriction of allocated resources for transmission to one or more defined time intervals. Said direct communication is also referred to as D2D, which is designed to provide proximity services. ProSe for short. D2D communication is accomplished directly between two mobile devices, while the cellular communication furthermore involves at least one central unit (such as a base station) establishing and coordinating an indirect communication between at least two devices. In some variants of D2D/ProSe the user equipment should have the opportunity to independently select resources from the second pool for their currently required D2D/ProSe services. Such an direct LTE discovery between user equipment is provided by the technical specification by 3GPP. TR 36.843, version 12.0.1, chapter 8.1 as well as the further technical specification, also by 3GPP. TR 36.843, version 12.0.1, section 9.1.2, describing LTE direct communication-mode 2.

This D2D/ProSe resource pool can be signalled from the network side. Signalling a resource pool creates the possibility that the amounts of allocated resources may be changed dynamically. At a high resource demand resources can be made available. Unused D2D/ProSe resources can be allocated for another purpose, such as the cellular use. By the independent allocation of the D2D/ProSe resources by user equipment the resource controller has no overview of the overall resource usage.

US 2014/0094183 A1 describes a mechanism for resource allocation for a D2D communication. Once D2D resources have been allocated, current resource utilization is detected to determine whether suitable resources are available or not. An overload may be signalled to the eNB if no suitable resource can be detected.

3GPP TS 23.303, version 12.1.0 provides a technical specification of group services and system aspects, related to proximity services. ProSe. According to this technical teaching the D2D communication refers to a communication mode between a pair of user equipment that enables a user equipment to directly communicate an exchange data with a neighbouring user equipment without the help of a cellular network and each user equipment for D2D communication broadcasts the user equipment's information in order to inform other user equipment of information on itself. A user equipment's own information used to inform other user equipment of information on itself may include for example information such as an identifier. In addition, a user equipment acquires information on counterpart user equipment through expressions received from neighbouring user equipment and attempts to perform D2D communication when discovering a counterpart user equipment of interest from this information.

WO 2014/116083 A1 provides a method and apparatus for performing a device-to-device. D2D, communication by a user equipment and supporting D2D communication by a communication entity.

US 2014/0187165 A1 provides a method for handling device-to-device communication for a first user equipment in a wireless communication system including establishing a radio resource control (RRC) protocol connection to a network of the wireless communication system and receiving a first RRC message indicating to the first user equipment to use a first data radio bearer for a proximity based service. ProSe, communication with a second user equipment of the wireless communication system.

WO 2014/115951 A1 is directed towards a method in an apparatus for use in a wireless communication system and is specifically directed towards a method of performing a discovery procedure for a ProSe and an apparatus therefore, in which scanning of one or more wireless local area network access points is performed.

Further documents relating to resource allocation in LTE D2D include Eurecom Research Report RR-13-290 entitled "Resource Allocation for LTE-Direct Broadcast of Periodic Vehicular Safety Messages" in which the allocation is quasi-static but may be modified by the network according to its needs. In a paper entitled "Design Aspects of Network Assisted Device-to Device Communications" by G. Fodor et al., IEEE Communications Magazine. May 2011, pp 2-9, network load, channel conditions and the intercell interference situation are indicated as being factors which should be taken into consideration when allocating resources.

It is known that radio resource allocation has to be provided in a D2D scenario and that therefore a radio resource controller has to be provided, which assigns resources. The state of the art furthermore recognizes that user equipment may select resources from resource pools to transmit the direct data and direct control information, but fails to provide a solution how such a need of further resources is to be detected. Considering the state of the art an approach including a protocol is required, which enables a dynamic resource allocation at runtime. Typically situations arise were the resource pool for device-to-device communication cannot be adapted according to the actual needs. Hence, it may occur that users, or user equipment, do not find any free resources being available. It may furthermore be the case that resources are left unused by the network although a need for resources is present regarding another purpose.

SUMMARY

The present invention is directed towards a resource controller for radio resource management in a telecommunication network. In particular, it relates to a network arrangement allowing the dynamic distribution of resources for enabling user equipment to establish a direct communication and/or cellular connection, especially within the context of the 3GPP Long Term Evolution (LTE) standards relating to device-to-device (D2D) communication and proximity services (ProSe). The present invention furthermore provides a respective method for operation of said resource controller and user equipment. The present invention is furthermore directed towards a user equipment and a base station for radio resource management. Furthermore a telecommunication network arrangement is provided, which involves the suggested user equipment and base station.

The present invention provides benefits for cell phone manufacturers and respective distributors as well as network providers along with component suppliers. In the technical field of mobile telecommunication systems a novel approach is suggested that performs load balancing of resources under consideration of specific network situations and especially under usage of mobile phone functionality to its full capacity. While several approaches to resource and load balancing are known in the context of cluster technology and client/server architectures the present approach is directly tailored to mobile devices and respective mobile telecommunication networks. According to the present invention hardware and control logic of mobile phones, more generally called user equipment, is exploited for measuring actual resource requirements, which are signaled for instance to a base station. Therefore, the present invention takes advantage of mobile phone capabilities and the specific, maybe location dependent, current situation regarding resource requirements according to actual and current usage scenarios and use cases. Hence, user demands are respected and resources are provided for an optimal functioning of involved devices for satisfying a user centered system behavior. Supported use cases involve a repeatedly switching between device-to-device communication and cellular communication, for instance according to a LTE specification. The present invention can also advantageously be applied at a simultaneous operation of both approaches, the device-to-device communication as well as the cellular communication. Hence, existing technologies, such as Near Field Communication, Bluetooth, WLAN. LTE and further more can be integrated towards a single approach avoiding their prevailing coexistence. Hardware efficiency is reached by an optimal distribution of available resources. The suggested modules can be distributed among the hardware devices of the underlying network as well as across the involved user equipment.

DETAILED DESCRIPTION

Figure 1:
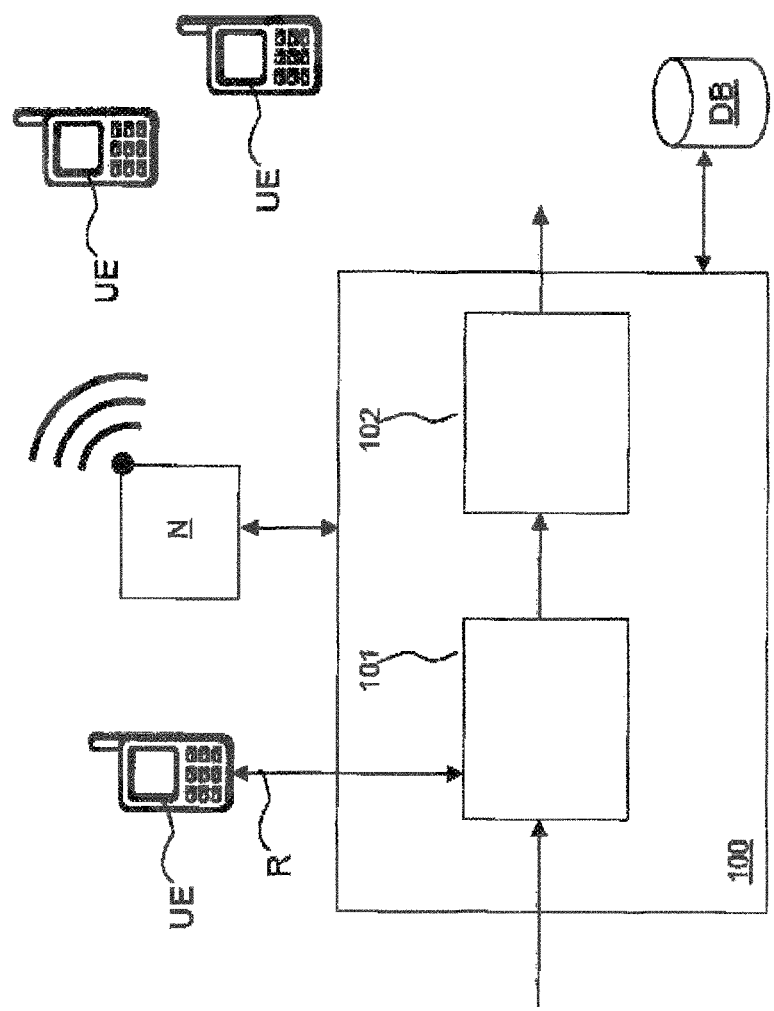
FIG. 1 shows a resource controller arrangement for resource management in a telecommunication network according to an aspect of the present invention.

It is therefore object of the present invention to provide an improved resource controller along with a respective method for operation thereof. Especially, it is an object of the present invention to provide an improved approach, which allows a dynamic resource allocation at runtime, balancing the actual needs of D2D communication and cellular communication, especially in a mobile telecommunication network.

These objects are solved by a resource controller for radio resource management in a telecommunication network with features according to claim 1.

Accordingly a resource controller for radio resource management in a telecommunication network is provided, the telecommunication network providing a first set of resources for cellular communication and a second set of resources for direct device-to-device communication between user equipment, the resource controller comprising a measurement request unit being arranged to request a measurement being performed by at least one user equipment, the measurement indicating a capacity utilization (i.e. the degree of capacity utilization or the amount of occupied resources) of the second set of resources and a resource pool adaption unit being arranged to adapt the first set of resources and the second set of resources as a function of the performed measurement.

The network is arranged to request measurements from the user equipment, which indicate the actual usage of the shared D2D/ProSe resources being managed in the second resource pool. The user equipment is arranged to perform the requested measurements and signal the results back to the network. Based on the received measurement results the network is arranged to determine the required device-to-device resources and thereupon signals an adapted amount of resources for the D2D user equipment. This means the network may choose to increase the amount of resources in the second pool by decreasing the amount of resources in the first pool or vice versa.

In addition the user equipment is arranged to request an increase regarding the resources of the second pool from the resource controller RC. This is of advantage in case all resources provided by the second pool, namely the D2D/ProSe pool are occupied. Also this message can be used by the resource controller RC to determine the amount of required D2D/ProSe resources in the second pool and to signal thereupon an adapted (here: increased) amount of free resources to the D2D equipment.

Furthermore, the user equipment is arranged to inform the network about unused resources of the second pool. This is of advantage in case a large portion of resources provided by the second pool, namely the D2D/ProSe pool is left unused (at least for a predefined amount of time). Also this message may be used by the resource controller RC to adjust the amount of required D2D/ProSe resources in the second pool and to signal thereupon an adapted (here: reduced) amount of resources to the D2D equipment.

In both cases (not enough resources are provided by the second resource pool, or too much resources are provided by the second resource pool) a timer in the UE is helpful in order to prevent the UE from informing the network too quickly and/or to request adaptation of resources too often. The timer in the UE may be configurable by the resource controller RC.

In this context signalling means for instance the transmission of control information by a respective message. Increasing and decreasing the first or second pool means to allocate resources from one of the pools, which were previously allocated by the respective other pool. It is furthermore of advantage to reallocate freely available resources from one pool, that are left unused, to another pool which has an increased demand for further resources.

The notion of a resource addresses physical entities, especially time and frequency for data transmission. The feature of providing resources addresses the allocation of processing time and storage space in involved data storages, data buffers and the like. Providing resources regarding time or frequency may involve further techniques such as time division multiplexing TDMA and/or frequency division multiplexing FDMA. The allocation of frequency may be performed by establishing a grant to transmit on a certain spectrum, band, channel or the like. The person skilled in the art appreciates further examples of how to provide resources regarding the establishment of a communication in a telecommunication scenario. The person skilled in the art furthermore appreciates that especially a wireless telecommunication system in the sense of a mobile telecommunication system is suitable for implementing the present invention. An application scenario of the present invention is the provision of a LTE network.

A device-to-device communication is performed under coordination of the involved devices themselves. In contrast to this a cellular communication requires a further central device, which sets up a cell and coordinates and synchronizes the respective communication as an intermediate device. This may refer to static cells, for instance provided by a router or base station, or a mobile cell, for instance being provided by a further intermediate device setting up a cell.

The resource controller itself may be implemented as a part of the telecommunication network or may be integrated in one of the commonly known legacy devices such as the user equipment or a commonly known base station. The suggested resource controller can furthermore be implemented by means of hardware adaptions or by specialized software modules.

The measurement request can be signalled from the resource controller to at least one of the user equipment. It may also be of advantage to implement an autonomous measurement request unit in at least one user equipment, which invokes measurements being performed by the at least one user equipment, which are then sent to the network. Therefore, it may be the case that the measurement request unit and the resource pool adaption unit are implemented on separated devices, which are connectively coupled. Based on hardware considerations an implementation on one single module is also a possible option for provision of said resource controller arrangement. The performed measurement indicates the capacity utilization of the second set of resources. Such a capacity utilization may indicate a transmission time or a transmission frequency as well as further hardware parameters such as a capacity utilization of a processor or a memory allocation. The measurement may for instance deliver the information that a buffer of a hardware device is full and may therefore require further buffers or it may require increased transmission resources in order to empty the buffer. The measurement may alternatively deliver the information that such a buffer is empty for a longer period of time and therefore buffer space can be provided for another purpose or transmission resources can be decreased and allocated to other devices or other pools. Hence, a dynamic reallocation of hardware capacity being used either for direct device-to-device communication or cellular communication is made possible. The resource controller arrangement is enabled to dynamically provide resources between the two pools.

The received measurement can be interpreted by the resource pool adaption unit according to a provided metric and can balance the provided resources between the first pool and the second pool of resources. This is accomplished by allocating resources from one of the involved pools to the respective other pool. In this sense a pool is a logical assignment to one of the transmission techniques, namely a direct device-to-device communication or a cellular communication. Hence, the resource pool adaption unit is a resource broker mediating between the involved hardware devices.

It is therefore of advantage to detect or measure the resource allocation of the direct user equipment to user equipment connections and request further (or less) resource allocations and configure the usage of their shared resources for the direct user equipment to user equipment connections according to actual needs.

According to an aspect of the present invention the resource pool adaption unit is arranged to dynamically allocate provided resources for either the first set of resources or for the second set of resources. This provides the advantage that a dynamic resource management regarding allocation from the first set of resources to the second set of resources or vice versa is provided at runtime.

According to a further aspect of the present invention the resource controller is connectively coupled to at least one network device for resource allocation. This may be of advantage as legacy base stations and user equipment can be applied and further a resource controller according to the present invention can be easily integrated.

According to a further aspect of the present invention the device-to-device communication provides proximity services. This may provide the advantage that specialized services, which benefit from the embodiments of the present invention, can be applied and existing specifications of proximity services can be applied for implementing the present invention.

According to a further aspect of the present invention the telecommunication network is operated according to one of a group of standards, the group comprising GSM, UMTS and several specifications related to LTE. This provides the advantage that the present invention can be applied in greater frameworks under usage of the already provided hardware.

According to a further aspect of the present invention a user equipment is formed by one of a group of mobile devices, mobile phones, cell phones, handheld computers, notebooks, netbooks, PDAs, pagers, tablet computers, navigation systems and entertainment devices. This provides the advantage that the present invention can be applied in a variety of usage scenarios.

According to a further aspect of the present invention a cellular communication is established under usage of at least one of a router, a base station, an access point, a hot spot, a user equipment and an eNB (enhanced Node B) transmitter. This provides the advantage that the present invention can be implemented in a mobile-to-mobile scenario as well as a location static scenario or any mixture thereof.

According to a further aspect of the present invention the resource controller is arranged to demand additional resources from the network in case a current capacity of the first and for the second pool is insufficient. In case the network is able to provide additional resources beyond those being allocated by the first and the second pool they can be made available and be assigned to either the first or the second pool. Hence, the amount of resources as initially provided is increased and distributed among the first and the second pool. The detection of a state of insufficient resources can be accomplished on the basis of thresholds under which resources are not enough. On the other hand if resources exceeding a certain threshold are available resources may be freed. This provides the advantage that additional resources can be made available in case either the first set of pools or the second set of pools is insufficient.

According to a further aspect of the present invention the resource adaption unit is arranged to adapt the set of resources as a function of a provided adaption metric. This provides the advantage that several algorithms or rules can be provided, which allows a dynamic resource management.

According to a further aspect of the present invention the adaption metric considers at least one of a number of received measurements indicating a capacity utilization, a location stamp, a geographic position of the user equipment, a distance to at least one further user equipment, a distance to at least one further network device, a service to be provided by a user equipment, a wait period of a user equipment and a network configuration. This provides the advantage that a huge variety of usage scenarios can be the basis for the suggested invention as being defined in the further embodiments.

Furthermore a method for resource management in a telecommunication network is provided, the telecommunication network providing a first set of resources for cellular communication and a second set of resources for direct device-to-device communication between user equipment, the method comprising requesting a measurement being performed by at least one user equipment, the measurement indicating a capacity utilization of the second set of resources as well as adapting the first set of resources and the second set of resources as a function of the performed measurement.

Furthermore, user equipment and base stations are provided which make use of the suggested resource controller arrangement along with respectively adapted methods for performed by the suggested devices. Each of the methods may be stored on a computer readable medium comprising instructions which cause one or more processors to perform said methods.

The objective is also solved by a resource controller arrangement along with a respective method for operation thereof. Hence, a resource controller arrangement for distributed resource management in a telecommunication network is suggested, the telecommunication network providing a first set of resources for cellular communication and a second set of resources for direct device-to-device communication between user equipment, the resource controller arrangement further comprises a measurement request unit being arranged to request a measurement being performed by at least one user equipment, the measurement indicating a capacity utilization (i.e. the degree of capacity utilization) of the second set of resources and a resource pool adaption unit being arranged to adapt the first set of resources and the second set of resources as a function of the performed measurement.

Furthermore, a method for distributed resource management in a telecommunication network is described, the telecommunication network providing a first set of resources for cellular communication and a second set of resources for direct device-to-device communication between user equipment, the method comprising requesting a measurement being performed by at least one user equipment, the measurement indicating a capacity utilization of the second set of resources and adapting the first set of resources and the second set of resources as a function of the performed measurement. The person skilled in the art appreciates that such a method can be described by instructions being stored on a computer readable medium.

In the following same notions will be denoted with the same reference signs if not indicated otherwise.

FIG. 1 shows a resource controller arrangement 100 for resource management in a telecommunication network N. The telecommunication network N provides a first set of resources for cellular communication and a second set of resources for direct device-to-device communication between user equipment UE and comprises a measurement request unit 101 being arranged to request R a measurement being performed by at least one user equipment UE, the measurement indicating a capacity utilization of the second set of resources and furthermore comprises a resource pool adaption unit 102 being arranged to adapt the first set of resources and the second set of resources as a function of the performed measurement.

As being shown in FIG. 1 the measurement request unit 101 as well as the resource pool adaption unit 102 may reside on a shared device. Hence, the resource controller arrangement 100 may be formed by a single resource controller 100. It may furthermore be the case that all of the involved units, for instance unit 101 and 102, are deployed among several devices. It may for instance be of advantage to provide a user equipment UE, which holds the measurement request unit 101 performing automated measurements. Furthermore a base station can be provided for implementation of the resource pool adaption unit 102. The measurement request unit 101 and the resource pool adaption unit 102 are connectively coupled. Therefore it is possible that the resource pool adaption unit 102 invokes a measurement of a capacity utilization. After having performed this step the measurement request unit requests from at least one user equipment UE to perform such a measurement. The user equipment UE can optionally be arranged to address further units for performing the required measurement.

The person skilled in the art appreciates that a measurement is a non-restrictive notion, which can be likewise described as detection of a capacity utilization. Therefore, a measurement can be performed by reading out a memory, a configuration file or any further hardware/transmission status. In case such a status is read out by the measurement request unit 101 several further units for measuring may be applied, such as respectively arranged sensors. It may therefore be of advantage that a detection indicating a capacity utilization is applied.

Referring to FIG. 1 it can be seen that the measurement request unit 101 is connectively coupled to at least one user equipment UE. Hence, the measurement indicating a capacity utilization is either performed by one single user equipment UE or by several user equipment UE. It may be the case that all user equipment UE being subscribed in a cell are involved in the measurement of the capacity utilization.

The present invention therefore allows a sensing of required resources for device-to-device communication and/or cellular communication. It is therefore possible to detect how many and exactly which resources are required for a set of user equipment UE that are involved in device-to-device communication and furthermore how many and which resources are required for cellular communication. On the basis of this information the resource pool adaption unit 102 decides how to adapt the first set of resources for cellular communication and the second set of resources for direct device-to-device communication. In case the first set of resources is already exhausted and further available resources are detected in the second set of resources a reallocation of resources can be accomplished providing more resources for cellular communication and less resources for direct device-to-device communication. The same applies the other way round in case the second set of resources is found to be exhausted and there are freely available resources in the first set of resources. It may furthermore also occur that both sets of resources are exhausted and the resource pool adaption unit 102 has to request additional resources from other network devices to enhance at least one of the two resource pools.

According to a further aspect in a mobile telecommunications system according to LTE/LTE-Advanced, said additional resources could for instance be provided by another cell or frequency layer, i.e. by handing over some of those user equipment UEs that only require a cellular connection as opposed to a direct device-to-device connection. For example, the other cell could be a neighbour cell of the same or different radio access technology and the other frequency layer could be provided by carrier aggregation methods if these are offered at the respective location.

A request R for capacity utilization measurement can be performed either by a direct invocation of such a measurement or can be accomplished according to a predefined time table (i.e. the measurement(s) is/are triggered by a timer). It may also be of advantage to invoke such a measurement on the basis of a specific user behavior (i.e. the measurement(s) is/are triggered by an event). For instance a user equipment UE shows a certain transmission behavior and thereupon measurements are performed for instance before each sending and/or transmission step. Hence, the measurement request unit triggers the measurements on a provided metric. In the present FIG. 1 the measurement is handed back to the measurement request unit 101. The person skilled in the art appreciates that the resulting measurement values can be handed back directly or indirectly to the resource pool adaption unit 102. This may for instance be performed by a communication with any network device such as an intermediate network device as the base station. It may further be of advantage to store such measurements in a database DB for further processing. Such a database can, according to further aspects of the present invention, also be arranged to provide instructions for causing the resource controller arrangement 100 or further units, such as the measurement request unit 101 and the resource pool adaption unit 102 to perform according to the present invention. The database DB, for instance a server or a memory of any of the present units is connectively coupled to at least one of said units or the resource controller arrangement 100. Therefore the database DB may be implemented physically on one of the suggested units. It can also be a part of any network device, such as the base station, and provide the instructions over a wireless network.

While the present embodiment according to FIG. 1 illustrates an implementation of the measurement request unit 101 and the resource pool adaption unit 102 on a single shared module, it may also be of advantage to provide such units on one or across several user equipment UE. This enables a method according to the present invention to be performed also in a mobile device-to-device communication scenario. Such a usage scenario may therefore be accomplished without a cellular communication network and therefore without providing the central unit N. In case the user equipment UE perform a direct device-to-device communication the situation may change with their change regarding the geographic position. While at a first point in time only device-to-device communication is possible, it may further occur that at a different geographic location a subscription to a cellular communication takes place and additional resources for the first set of resources are available. Hence, each of the measurement request unit 101 and the resource pool adaption unit 102 can be provided redundantly throughout the user equipment UE and the involved base stations. While at a first point in time units, such as the measurement request unit 101 and/or the resource pool adaption unit 102, of the user equipment are used for accomplishing the suggested method at a second point in time the measurement request unit 101 and/or the resource pool adaption unit 102 of a base station may be used. Hence, the involved units can also be present in both the user equipment UE as well as the telecommunication network N and can be addressed according to the very specific situation of the geographic location of the user equipment UE.

While at a first point in time only direct device-to-device communication may be possible at a further second point in time also cellular communication may be available and therefore a dynamic adaption of the two sets of resources is required. The suggested resource controller arrangement 100 is arranged to adapt the provided pools according to each specific user equipment UE situation. This provides the advantage that no resources are left unused in case they are required and furthermore that common resources can be shared by a respective rearrangement of each of the provided pools.

Referring to the present FIG. 1 the person skilled in the art appreciates that further units, which are not shown in the present figure, may be required and furthermore that the dataflow as being indicated by the arrows can be performed also in a different way. The provided arrows may for instance be implemented in an alternative fashion such that the indicated logical or physical interfaces can be provided as a physical bus system or by wireless communication.

Figure 2:
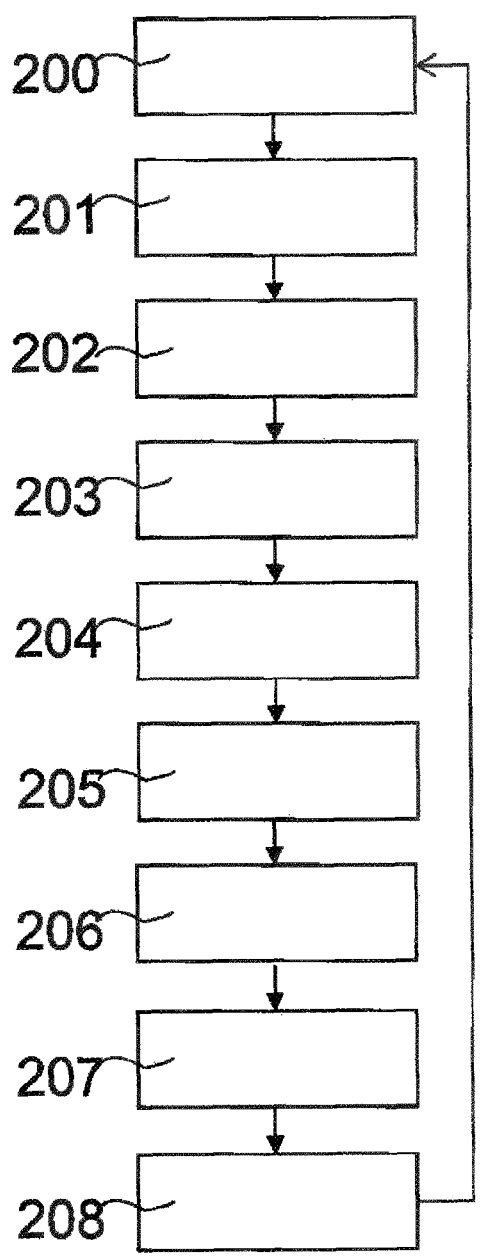
FIG. 2 shows a method for operating said resource controller arrangement for resource management in a telecommunication network according to an aspect of the present invention.

FIG. 2 shows a method for radio resource management in a telecommunication network according to an aspect of the present invention. In a first optional step 200 a telecommunication network is provided and a set of user equipment subscribes to base stations or establishes a direct device-to-device communication as a typical usage scenario of a telecommunication network. In a further method step 201 a measurement request is triggered, which invokes a measurement, which is afterwards performed in method step 202 by at least one user equipment. For performing said measurements further method steps may be required for synchronization of user equipment such that they provide one or several measurements indicating a capacity utilization of required resources for direct device-to-device communication. These measurement results are handed over in step 203 to a resource pool adaption unit. In a further step 204 the resource pool adaption unit interprets the measurements as being provided in step 203 and in further steps the respectively available resources are readapted. Therefore a reallocation configuration is set up in step 205. In step 206 resources from the first pool of resources can be made available. These resources are reallocated in step 207 as being part of the resource pool for direct device-to-device communication. In an additional optional method step 208 further measurements can be invoked for detection if the capacity utilization is now in balance, which terminates the suggested method. It may also be measured that the allocation is still not appropriate according to posed requirements and a further reallocation step is necessary.

The person skilled in the art appreciates that the aforementioned method steps may be performed iteratively or at least partly in a different order. It is of advantage to perform single steps, such as the capacity utilization measurement step iteratively, while a re-adaption of the sets of resources is only accomplished if inappropriate capacity utilization is detected. At any step it is also possible that the configuration of the underlying network changes and therefore that after any of the provided steps the method step 200 is accomplished. This is the case if the network is changed according to a handover from one base station to another or that additional user equipment are available for direct device-to-device communication.

Figure 3:
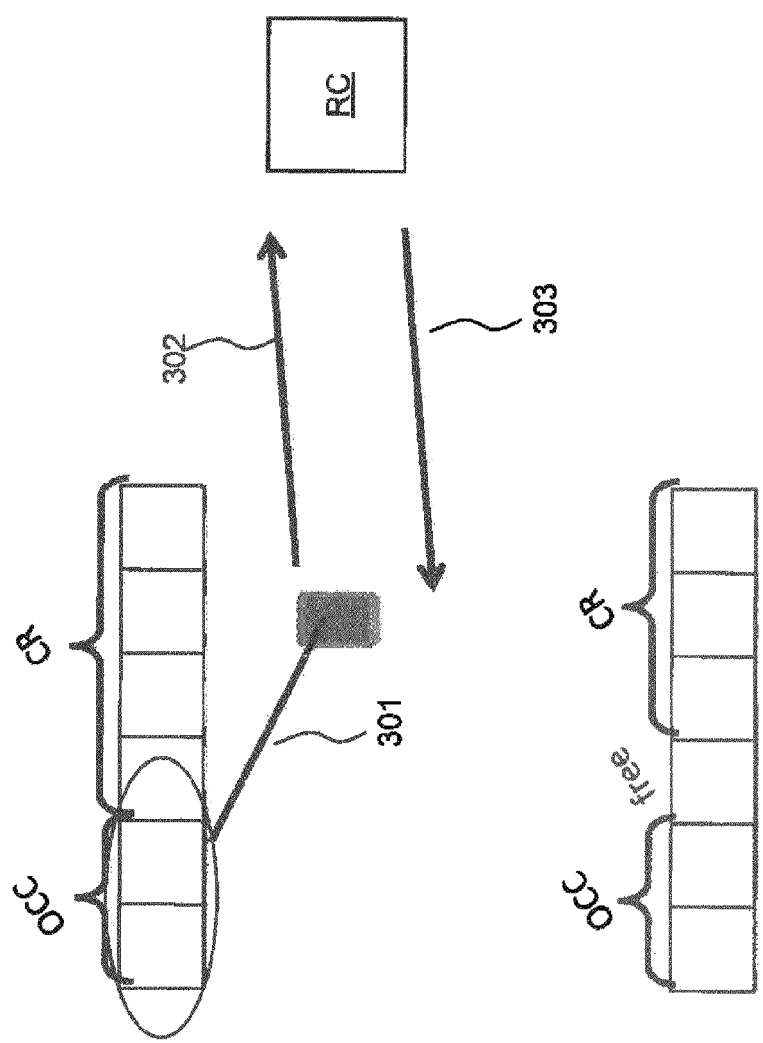
FIG. 3 shows a usage scenario of a method for resource management in a telecommunication network according to an aspect of the present invention.

FIG. 3 shows a usage scenario of the method for resource management in a telecommunication network according to an aspect of the present invention. Especially the resource pools are shown, which divide the overall existing resources. In the present embodiment the resources are indicated by six rectangles. At a first point in time two resource units are allocated for direct device-to-device communication and are therefore occupied OCC. Furthermore four resource units are allocated as cellular resources CR. In a first step 301 the user equipment UE performs a resource allocation measurement, also referred to as capacity utilization measurement (or capacity utilization measurement), maybe by its own motion, because itself requires further direct device-to-device resources, also referred to as D2D-ProSe resources, from the second pool. The invocation of the measurement may also be performed by the resource controller RC, which may be part of the eNB or the ProSe function. The ProSe function may be operated according to standard TS 23.303, version 12.0.1. While measuring the user equipment UE detects that a strong resource utilization is currently the case and that no resources are available. This is signaled to the resource controller RC in method step 302. The resource controller RC thereupon configures the sets of resources in a way that the second pool receives additional resources for instance by a decreased resource allocation of the first pool. This adaption is signaled to the other user equipment in method step 303. As can be seen at the bottom of this figure, the cellular resources CR are decreased by one resource unit. This one single resource unit, which is denoted as being "free" is afterwards assigned to the second pool of resources. Hence, in a final resource configuration the second pool comprises two occupied OCC resource units and one freely available resource unit.

Figure 4:
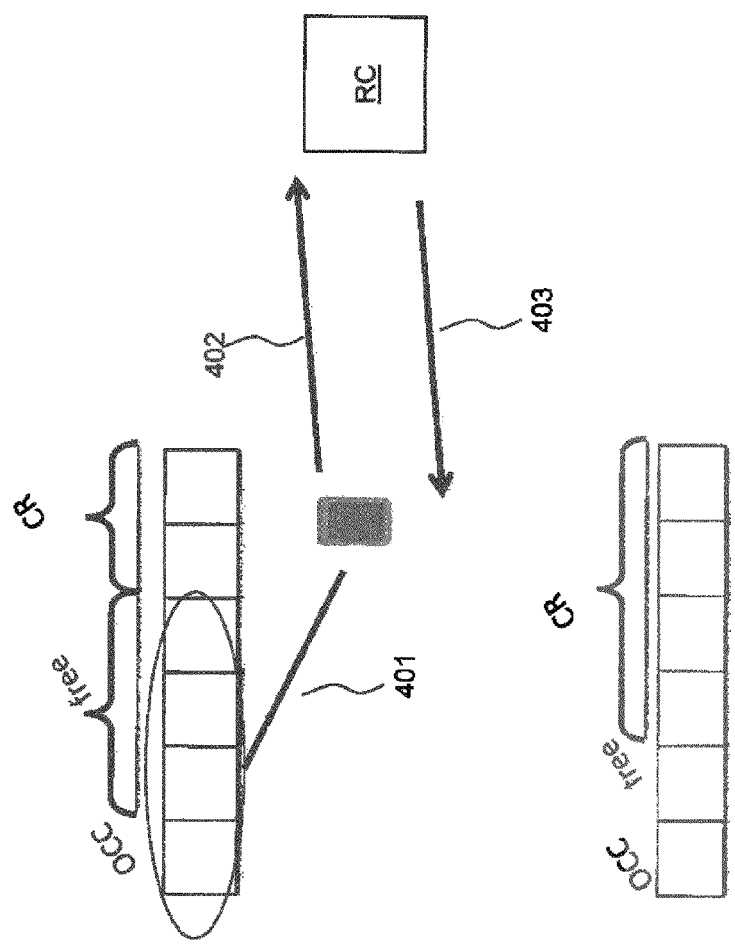
FIG. 4 shows a further usage scenario of a further method for resource management in a telecommunication network according to a further aspect of the present invention.

FIG. 4 shows a further usage scenario of the suggested method for resource management in a telecommunication network according to a further aspect of the present invention. In this embodiment an initial resource configuration holds four resource units in the second pool for direct device-to-device communication as being depicted in the topmost resource configuration on the left hand side. Hence, the first pool providing the cellular resources CR only comprises two resource units. The second pool of resources comprises one occupied resource unit OCC and three freely available resource units. The user equipment UE according to this embodiment performs a measurement of the resource utilization in method step 401 and reports to the resource controller in a further method step 402 that three resource units are freely available. Thereupon the resource controller decides to allocate two more resource units for the cellular resources CR which after the adaption of both pools comprises four resource units. As previously in the initial resource configuration three D2D resources were available and only two have been reallocated to be comprised in the first pool; as a result one D2D resource is still freely available.

Figure 5:
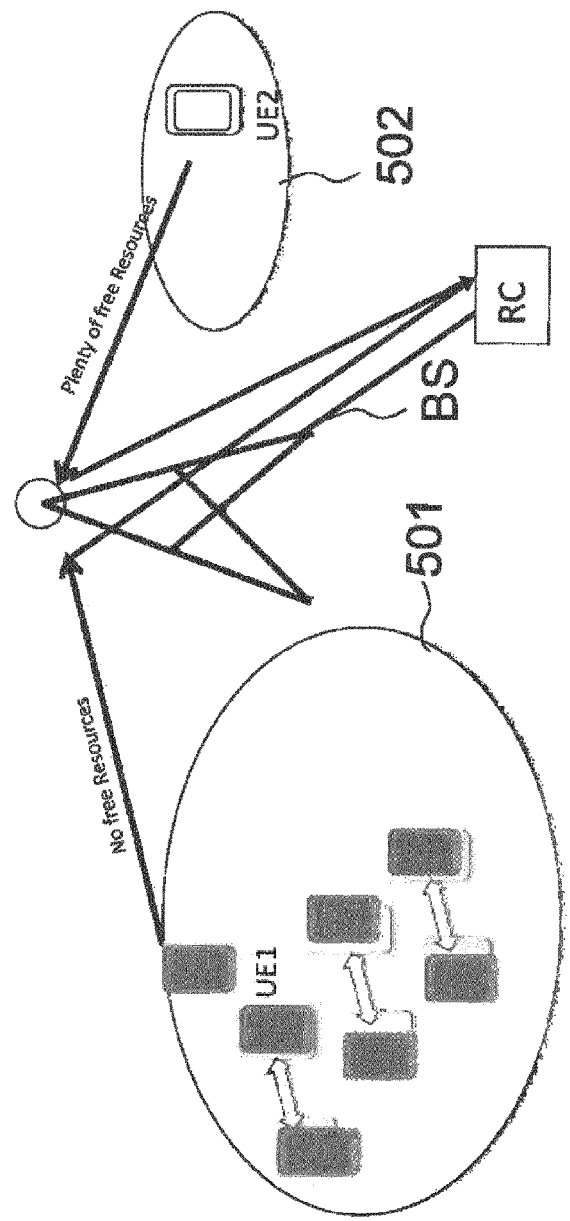
FIG. 5 shows a further usage scenario of a further method for resource management in a telecommunication network according to a further aspect of the present invention.

FIG. 5 shows a further usage scenario of the method for resource management in a telecommunication network according to a further aspect of the present invention. In the present embodiment the first user equipment UE1 reports missing resources (for D2D communication) and the second user equipment UE2 reports freely available resources (for D2D communication). This situation occurs in case the first user equipment UE1 is in close proximity to a huge variety of D2D user equipment and furthermore the second user equipment UE2 is located at only a few active D2D user equipment. Both user equipment UE1 and UE2 are subscribed within the same cell but located distantly such that no mutual interference occurs.

In this situation two approaches can be applied according to the present invention.

Firstly, the resource controller RC makes a majority decision. That is, it increases the resource pool (for D2D communication) when a certain number of user equipment reports too few resources and it reduces the pool of resources (for D2D communication) when few or no user equipment report missing resources. The resource configuration is always active in this example over the entire cell, in which it is transmitted. It may also include other decision criteria further than the majority or the sheer number of user equipment reporting a need for resources. Therefore, the majority decision is only mentioned as an example within this embodiment.

Secondly, the resource controller RC determines position dependent resource pools. The user equipment UE transmit their current location together with the measurement report to the resource controller RC. The resource controller RC will then increase the device-to-device resource pool at the position of the first user equipment UE1 and decrease the respective pool at the position of the second user equipment UE2, if UE1 and UE2 are not residing in the same cell. In another embodiment, if UE1 and UE2 are residing in the same cell, the resource controller RC will increase the device-to-device resource pool at the position of the first user equipment UE1 (by assigning previously free resources to said resource pool) and decrease the device-to-device resource pool at the position of the second user equipment UE2 (by freeing resources previously assigned to D2D), while leaving the first resource pool for cellular communication the same. Therefore, the resource configuration can be enhanced by an absolute positioning information or a relative position is indicated, for instance that the resources are only available in case one user equipment is in close proximity to another user equipment. This may be defined between specific user equipment or between several user equipment, such as a cluster of user equipment. Therefore, it is mandatory to add location information to the resources of the first pool, namely the resource pool for cellular communication. It can be determined if a user equipment requiring cellular resources is in proximity to a cluster controller. The D2D resources being assigned to this cluster are not allocated for cellular transmissions in case the user equipment is in a close proximity. The resource controller has for this purpose to detect the configured device-to-device resources and the respective cluster controller of the instance configuring the cellular resources, for instance the eNB. In case the measurement results of the device-to-device user equipment contain location information this information can also be used for further scenarios as described above and the respective decisions of the resource controller RC. For instance it may be known by the resource controller RC or the cNB that the cellular resources, first pool of a cell are more or less unused but at the specific position, which lacks resources of the second pool, such resources are freely available. Therefore, an efficient reallocation of resources takes place. This is accomplished by an efficient and dynamic resource management between the set of resources for direct device-to-device communication 501 and the pool for cellular connection 502. Such a logic may be implemented in the base station BS or among the user equipment UE1 or UE2.

Figure 6:
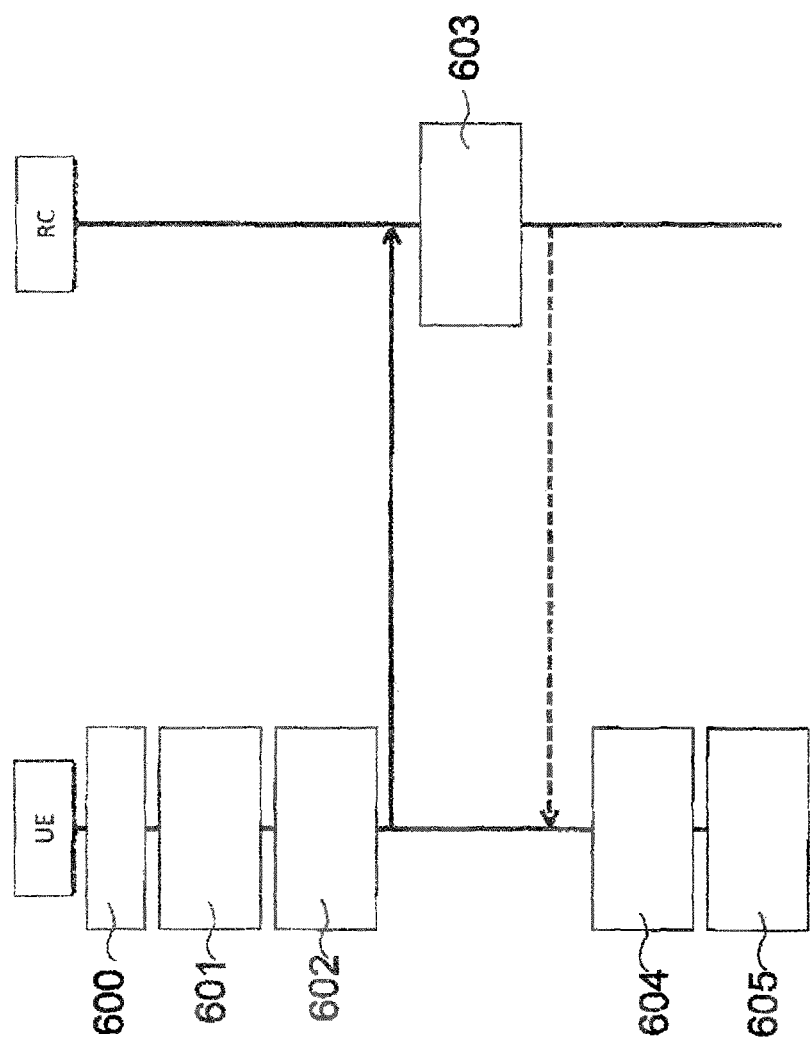
FIG. 6 shows a sequence protocol illustrating a method for resource management in a telecommunication network according to an aspect of the present invention.

FIG. 6 illustrates a usage scenario of the suggested method for resource management in a telecommunication network according to a further aspect of the present invention. FIG. 6 especially addresses the issue at what point in time the measurements are performed. According to an aspect of the present invention the user equipment itself initiates the measurement. Therefore, the user equipment itself provides the measurement request unit. In a first step 600 the user equipment decides to use a direct device-to-device communication. In a further method step 601 a resource occupation measurement is performed. In case no or too few free resources are found in step 602 a resource pool reconfiguration request is signalled to the resource controller RC which evaluates in step 603 a potential resource configuration. This resource pool configuration is handed back to the user equipment which performs an additional resource occupation measurement in method step 604. Furthermore, freely available resources are occupied in method step 605.

The self-initiated measurement is of advantage in case the user equipment intends to use a resource or currently uses such a resource because it benefits from the result. In case no resources or a few resources are available it sends a message to the resource controller RC. The resource controller thereupon initiates a resource reallocation regarding the resource pools and signals the amended resource pools.

It may further be of advantage that the resource controller RC sends a message to single or to several D2D user equipment, also referred to as dedicated signalling or broadcast signalling, when measurements of the resource allocations are to be performed.

Figure 7:
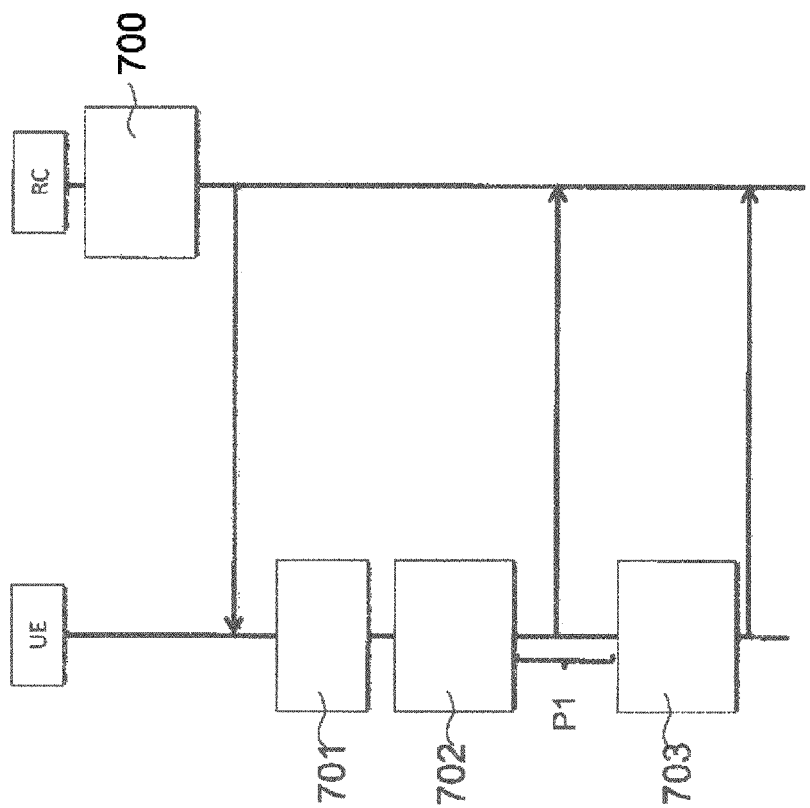
FIG. 7 shows a further sequence protocol illustrating a method for resource management in a telecommunication network according to a further aspect of the present invention.

FIG. 7 shows a further usage scenario of the suggested method for resource reconfiguration according to an aspect of the present invention. In this embodiment a measurement schedule is provided, for instance by storing such a schedule in the user equipment. It may be configured that each D2D device performs measurements after a period of time such as every 5 minutes and in addition every 60 minutes in case it does not use direct communication. The measurement results can be immediately or according to additional requirements signalled to the resource controller. Hence, a period of time P1 may be provided which separates two measurements. Alternatively, the user equipment could be configured to collect/write a number of (consecutive) measurements into a log file. Hence, a number A of (consecutive) measurements to be stored may be provided. A period of time P2 may also be provided, which separates two reporting activities (transmission of the log file containing the measurements from UE to the resource controller RC).

It can also be of advantage that the user devices which are transmitting, or intend to transmit, perform measurements and report said measurements. User equipment, which are only receiving signals may not need to perform a measurement. This is of advantage as the number of measurements and the reports to be transmitted is reduced without limiting the provided functionality.

When performing such measurements it may be of advantage to detect the energy or the signal strength on the device-to-device resources. A high energy or a signal strength indicates an occupied resource.

Furthermore, device-to-device communication typical signals, such as pilots or reference signals, can be detected and evaluated. It may furthermore be of advantage to receive further signals and evaluate them, such as the ID of the originator of the measured signals, such that measurements may provide information which indicate the user of a resource. This information can be provided to the resource controller RC.

A mean waiting period can be provided for using D2D resources. A longer period of time of waiting indicates a strong occupancy of the D2D resource.

Regarding the measurements it has to be distinguished between measurements of D2D resources for D2D communication, such as LTE direct communication, and for D2D discovery such as the LTE direct discovery. The measurement results are evaluated separately in the user equipment and afterwards are reported to the resource controller in case a predefined threshold is underrun or is exceeded.

In the present FIG. 7 an occupation measurement schedule is generated in method step 700 and is furthermore transmitted to the user equipment. Such an occupation measurement schedule may include the period as specified above as well as conditions for measurement. The occupation measurement schedule may also include whether the measurement is performed on resources dedicated to D2D communication, D2D discovery, both or whether the D2D usage is undefined. The occupation measurement schedule may also include detailed information about the resources to be measured and which of the measurement methods mentioned previously or not mentioned is to be used for the occupation measurement. Furthermore, the occupation measurement schedule may also include detailed instructions about log file creation (e.g., how many measurements per log file, etc.) and log file reporting (how often, reporting triggers, etc.). Upon reception the user equipment applies the occupation measurement schedule in method step 701 and performs an occupation measurement and furthermore performs a respective reporting in method step 702. The occupation measurement report is hence handed back to resource controller. After a certain period of time P1 the occupation measurement is performed again in method step 703 and again reported to the resource controller RC.

Figure 8:
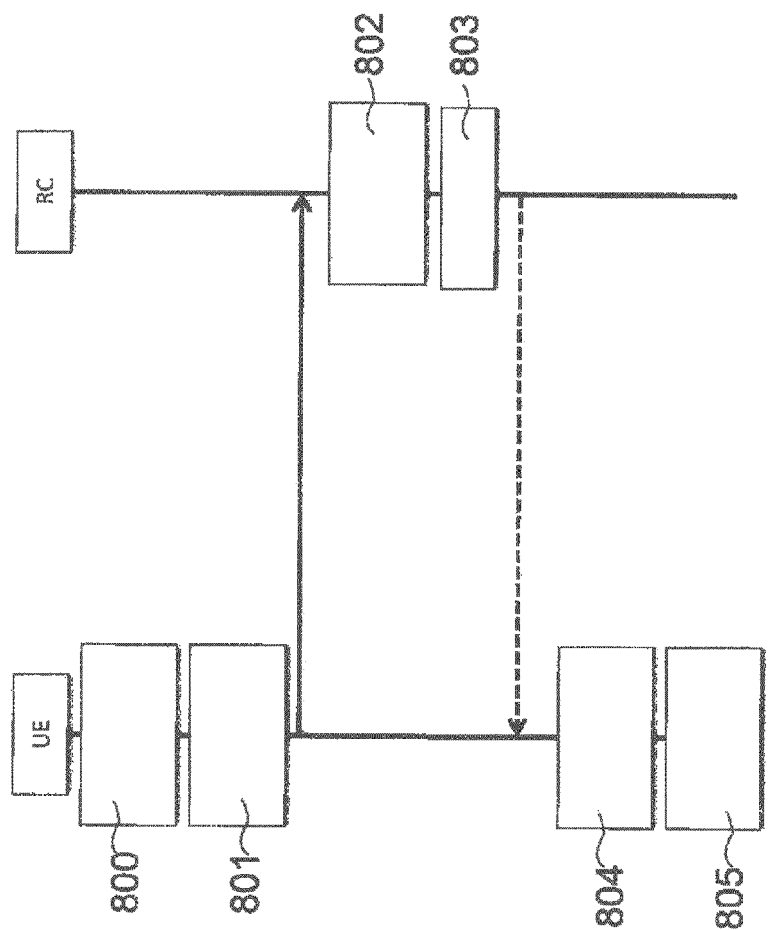
FIG. 8 shows a further sequence protocol illustrating a method for resource management in a telecommunication network according to a further aspect of the present invention.

FIG. 8 shows a further usage scenario of the method for resource management in a telecommunication network according to the present invention. In a first step 800 a resource occupation measurement is performed, which leads to a detection in method step 801 that no or too few free resources are found. Thereupon a bearer setup request is signalled to the resource controller. Such a bearer setup request may include the target D2D device, a respective reason for transmitting the report, such as missing D2D resources, and may further include the occupation measurement report. The resource reconfiguration is then evaluated in method step 802, which leads to a decision to use D2D in method step 803 according to the present embodiment. In which case a bearer setup reject message is sent to the UE with a reason "redirection to D2D-Resources, Resource-Pool update" and an additional resource occupation measurement is performed in method step 804. Thereupon freely available resources can be occupied in method step 805 and a D2D connection established.

In further embodiments of the present invention the user equipment intending to use direct device-to-device communication decide whether D2D communication should take place at all or if the connections to one or several other D2D user equipment is to be performed over a cellular mobile telecommunication connection. After evaluation of the available resources a decision can be immediately made in case the transmission is possible or it has to be decided to launch one of the above mentioned approaches for allocating additional D2D resources.

In case the decision is against the usage of the device-to-device communication resources a connection establishment over the infrastructure of the cellular mobile telecommunication network is performed.

A combined message is of special advantage in case an intended D2D connection lacks sufficient D2D resources. The user equipment sends in this case a message requesting an establishment of connection to the cellular network. This message comprises the information that the target is an end device in close proximity. This message is enhanced by the information indicating the measurement results of the device-to-device communication resource allocation and the reason for the cellular establishment of connection, namely the missing device-to-device communication resources. According to this setting it can be a wise decision of the network to either provide additional device-to-device communication resources and to replace the cellular establishment of connection by a device-to-device communication direct connection and to signal this to the user equipment or to establish a cellular connection and perform the necessary steps.

As set forth above a device for cellular and D2D, device-to-device, communication is suggested. The device is capable of performing proximity detection in the sense that near devices can be detected and information can be exchanged for maintaining at least one resource pool for D2D communication.

The device comprises means for measuring a capacity utilization level, i.e. the degree of capacity utilization, of D2D resources. For doing so measurements are performed, which deliver information such as a detected energy, information derived from reading out D2D information from other devices on to-be-measured carriers, optionally including time stamps or location stamps. The device holds means to communicate via D2D using the resource pool if certain conditions are not met, i.e. the conditions to perform measurements or to request resources are not met. Furthermore it comprises means to report the measurements to the resource controller if the certain conditions regarding the measurements are met. Such conditions are for instance that too few free resources are found to perform the envisaged D2D communication or thresholds for occupation are crossed in either direction, meaning too few or too much resources are allocated.

Furthermore, means to receive a resource allocation message that may adapt the resource pool for D2D is suggested within the device along with means to adapt the resource pool accordingly. A further aspect is the provision of means being comprised by the device to communicate via D2D using the adapted resource pool if the pool provides resources that are currently free to communicating and not to communicate via D2D if the pool does not provide such resources.

In accordance with the suggested device, also referred to as user equipment, a method for its operation is provided by the present invention. The method provides optional steps in which the user equipment sends a connection request containing D2D occupation measurements and leaves it to the resource controller to decide whether to use cellular or D2D communication. The underlying network is arranged to perform accordingly.

The suggested resource controller arrangement can be deployed across several user equipment or can be integrated into one single user equipment. At least one module thereof can also be integrated in a network device. Hence, the suggested methods may be performed using distributed components. Protocols allowing an information exchange in accordance with the suggested methods are also within the scope of this application.

Further aspects of the present invention include a mobile device enabled for direct communication, so called D2D communication, further comprising means to receive a measurement request for capacity utilization, for instance from a resource controller RC, means to measure the capacity utilization, means to report the capacity utilization, for instance to the resource controller RC, means to receive a resource pool re-configuration according to the reported capacity utilization, and means to select a resource for communication from the reconfigured resource pool. A resource controller is arranged to perform accordingly. A method for operating this mobile device and/or the resource controller is also suggested.

What is claimed is:

1. A resource management device for resource management in a telecommunication network, the telecommunication network providing for user equipment (UE) radio resources for cellular communication and radio resources for direct device-to-device communication between UEs, the resource management device comprising:
   a processor configured to:
      provide a first UE with a first pool of radio resources that includes a first set of radio resources for cellular communication and a second pool of radio resources that includes a second set of radio resources for direct device-to-device communication,
      receive a message from the first UE indicating an actual usage of the second set of radio resources included in the second pool of radio resources, and
      based on the message indicating the actual usage of the second set of radio resources included in the second pool of radio resources, determine on receipt of a bearer setup message from the first UE for establishment of a connection to a second UE, the bearer setup message indicating missing radio resources for device-to-device communication, (i) whether to reconfigure the second pool of radio resources that includes the second set of radio resources and inform the first UE that the second pool of radio resources that includes the second set of radio resources is to be reconfigured and that the first UE should establish device-to-device communication using the second pool of radio resources that was reconfigured, or (ii) that the first UE should perform a connection establishment for cellular communication using the first set of radio resources of the first pool of radio resources, wherein to establish the device-to-device communication, the first UE selects a radio resource from the second pool of radio resources that was reconfigured.

2. The resource management device according to claim 1, wherein the processor is further configured to:
receive a measurement performed by the first UE, the measurement comprising a wait period of the first UE for usage of the second set of radio resources, and
adapt at least one of: (i) the first set of radio resources or (ii) the second set of radio resources as a function of the measurement.

3. The resource management device according to claim 1, wherein the processor is further configured to dynamically allocate provided resources for either the first set of radio resources or the second set of radio resources.

4. The resource management device according claim 1, wherein the device-to-device communication provides proximity services.

5. The resource management device according to claim 1, wherein the processor is further configured to demand additional resources from the telecommunication network when a current capacity of the first set of radio resources and the second set of radio resources is insufficient.

6. The resource management device according to claim 1, wherein the processor adapts at least one of (i) the first set of radio resources or (ii) the second set of radio resources further as a function of a provided adaption metric.

7. The resource management device according to claim 6, wherein the provided adaption metric comprises at least one of: a number of received measurements indicating a capacity utilization, a location stamp, a time stamp, a geographic position of the user equipment, a distance to at least one further user equipment, a distance to at least one further network device, a service to be provided by the user equipment, a wait period of the user equipment, a mean waiting time, energy being detected on at least one carrier, device-to-device information from other devices on at least one carrier, or a network configuration.

8. The resource management device according to claim 1, wherein the bearer setup message from the first UE indicates that the second UE is proximal to the first UE.

9. The resource management device according to claim 8, wherein the bearer setup message from the first UE comprises measurement results of device-to-device communication resource allocation and indicates missing device-to-device communication resources.

10. A method for resource management in a telecommunication network, the telecommunication network providing for user equipment (UE) radio resources for cellular communication and radio resources for direct device-to-device communication between UEs, the method comprising:
providing a first UE with a first pool of radio resources that includes a first set of radio resources for cellular communication and a second pool of radio resources that includes a second set of radio resources for direct device-to-device communication;
receiving a message from the first UE indicating an actual usage of the second set of radio resources included in the second pool of radio resources; and
based on the message indicating the actual usage of the second set of radio resources included in the second pool of radio resources, determining on receipt of a bearer setup message from the first UE for establishment of a connection to a second UE, the bearer setup message indicating missing radio resources for device-to-device communication, (i) whether to reconfigure the second pool of radio resources that includes the second set of radio resources and inform the first UE that the second pool of radio resources that includes the second set of radio resources is to be reconfigured and that the first UE should establish device-to-device communication using the second pool of radio resources that was reconfigured, or (ii) that the first UE should perform a connection establishment for cellular communication using the first set of radio resources of the first pool of radio resources,
wherein to establish the device-to-device communication, the first UE selects a radio resource from the second pool of radio resources that was reconfigured.

11. The method for resource management according to claim 10, wherein the method further comprises:
receiving a measurement performed by the first UE, the measurement comprising a wait period of the first UE for usage of the second set of radio resources, and
adapting at least one of: (i) the first set of radio resources or (ii) the second set of radio resources as a function of the measurement.

12. The method or resource management of claim 10, wherein the bearer setup message from the first UE indicates that the second UE is proximal to the first UE.

13. The method of claim 12, wherein the bearer setup message from the first UE comprises measurement results of device-to-device communication resource allocation and indicates missing device-to-device communication resources.

* * * * *